Patented Aug. 8, 1933

1,921,138

UNITED STATES PATENT OFFICE 1,921,138

PRODUCTION OF MENTHENE

Walter Schoeller and Erwin Schwenk, Berlin-Westend, and Erich Borgwardt, Berlin-Pankow, Germany, assignors to Schering-Kahlbaum A. G., Berlin, Germany No Drawing. Application March 13, 1931, Serial No. 522,518, and in Germany March 20, 1930

3 Claims. (Cl. 260—167)

Our invention refers to the production of a menthene compound and more particularly to the production of 3-menthene. It is an object of our invention to produce 3-menthene from more readily available substances in a particularly simple and efficient manner.

Broadly spoken our invention consists in bringing about an intramolecular rearrangement of 1-menthene by subjecting it at elevated temperature and preferably at a temperature above 300° to the influence of a suitable catalyst. Under such conditions a mixture of various isomers of menthene, 50–90% of which are 3-menthene, may be obtained and separated from such mixture, for instance by fractionation. The first and the last fractions which chiefly consist of 1- and 2-menthene may be reused in cycle for the production of further quantities of 3-menthene.

The reaction underlying the present invention apparently proceeds as follows:

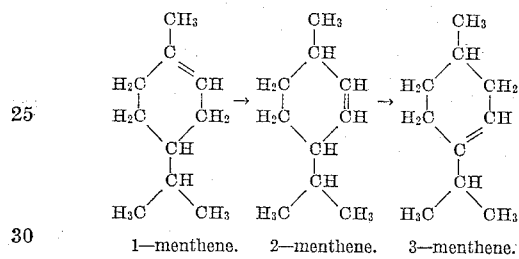

1—menthene.  2—menthene.  3—menthene.

In carrying out our invention we prefer to lead the vapor of 1-menthene or of a mixture of 1-menthene and other isomers of menthene at an elevated temperature over a suitable contact mass. Temperatures of 300–350° C. have been ascertained to furnish good results, but the temperature may be raised up to 450° and above, or lowered down to 250° and below without sacrificing the advantages of our invention.

The catalyst may consist of suitable bodies of great surface area per unit of volume, such as pumice stone, bricks, silica gel (i. e. activated silicic acid), of bleaching clay, fuller's earth, of zeolites, such as for instance the sodium aluminium silicate marketed under the trade-name "tonsil", or the like. These bodies which are known under the name of "surface catalysts" may be mixed or impregnated with or replaced by suitable metal compounds, such as the oxides, sulfates or phosphates of metals such as magnesium, copper and the like.

The time of contact between the menthene vapor and the catalyst should be regulated in accordance with the temperature and activity of the catalyst, and the vapors are then treated for the separation therefrom of the 3-menthene. To this end we may first cool them for the recovery of a liquid mixture containing several or all of the menthene isomers, and thereafter fractionally distill the liquid for the separation of substantially pure 3-menthene. The other fractions, which consist partly of unaltered 3-menthene and partly of other isomers such as the 2-menthene, may be once more subjected to the treatment according to the present invention, so that substantially all the 1-menthene originally used is recovered in the form of 3-menthene.

We prefer adding these fractions to further quantities of 1-menthene to be treated, the process being thus carried out in cycle.

Example 1

100 grs 1-menthene are led at a temperature of 450° C. over a catalyst consisting of pumice fragments and the vapors arising in this treatment are treated once more in the same way. After some hours the reaction mixture obtained is fractionated and about 87% of 3-menthene is obtained in the form of a colorless liquid boiling at 167–169°.

Example 2

Vapors of 1-menthene are led at a temperature of about 350° C. over a catalyst consisting of pumice fragments impregnated with about 5% magnesium sulfate. The vapors leaving the contact mass contain about 60% of 3-menthene which may be separated by fractional distillation, the residue being subjected to a further treatment as described with reference to Example 1.

Example 3

200 grs 1-menthene are led at a temperature of about 320–350° C. over a catalyst consisting of granulated copper phosphate which has been mixed with about ½% by weight phosphoric acid. The liquid reaction product is fractionally distilled and 50–60% of substantially pure 3-menthene boiling at 166–168° C. are collected. The first and the last fractions are mixed and led once more over the catalyst.

Example 4

300 grs 1-menthene are led at a temperature of 300–350° C. over a catalyst obtained by superficially oxidizing copper shavings, i. e. over a catalyst substantially consisting of copper oxide. A liquid reaction product is obtained from which 3-menthene may be separated as described with reference to Example 1.

*Example 5*

1-menthene is led over a catalyst as described with reference to Example 1, but the vapors thus obtained are passed through a fractionating column in which 3-menthene is separated, while the unaltered starting material may be reused in cycle, preferably in combination with additional quantities of 1-menthene replacing the separated amounts of 3-menthene.

Various changes may be made in the details disclosed in the foregoing specification without departing from the invention or sacrificing the advantages thereof.

We claim:

1. The method of producing 3-menthene comprising acting on 1-menthene at a temperature between 250 and 450° C. with a surface catalyst and separating 3-menthene from the mixture resulting in the reaction.

2. The method of producing 3-menthene comprising leading 1-menthene at a temperature between 250 and 450° C. over a surface catalyst and separating 3-menthene from the mixture resulting in the reaction.

3. The method of producing 3-menthene comprising leading 1-menthene at a temperature between 300° and 450° C. over a surface catalyst and separating 3-menthene from the mixture resulting in the reaction.

WALTER SCHOELLER.
ERWIN SCHWENK.
ERICH BORGWARDT.